United States Patent [19]

Mecke et al.

[11] Patent Number: 5,006,171

[45] Date of Patent: Apr. 9, 1991

[54] INK ERADICATOR FOR INKS CONTAINING TRIARYL METHANE DYESTUFFS

[75] Inventors: Norbert Mecke, Hanover; Albert Schmedes, Pattensen, both of Fed. Rep. of Germany

[73] Assignee: Pelikan Aktiengesellschaft, Hanover, Fed. Rep. of Germany

[21] Appl. No.: 454,778

[22] Filed: Dec. 19, 1989

[30] Foreign Application Priority Data

Dec. 19, 1988 [DE] Fed. Rep. of Germany ....... 3842774

[51] Int. Cl.$^5$ ................... C09D 11/00; C09D 13/00; C08C 3/00; B05D 3/10
[52] U.S. Cl. ......................................... 106/21; 106/19; 106/20; 106/22; 106/24; 106/25; 106/162; 427/273
[58] Field of Search ................ 252/90, 95; 427/273; 106/19, 20, 21, 22, 23, 24, 25, 162

[56] References Cited

U.S. PATENT DOCUMENTS 4,252,845 2/1981 Griffith et al. .................. 106/21

FOREIGN PATENT DOCUMENTS 0032652 7/1981 European Pat. Off. .
1111760 7/1961 Fed. Rep. of Germany .
2216951 4/1972 Fed. Rep. of Germany .

OTHER PUBLICATIONS

Römpps Chemie-Lexikon, pp. 4731 and 4732.

*Primary Examiner*—William R. Dixon, Jr.
*Attorney, Agent, or Firm*—Herbert Dubno

[57] ABSTRACT

An aqueous ink eradicator solution for inks utilizing triaryl methane dyestuff and containing a reducing sulfur compound. the ink contains 20 to 50% by weight of sugar and/or a solid sugar alcohol and the reducing sulfur compound in an amount of 0.5 to 5% by weight.

20 Claims, No Drawings

INK ERADICATOR FOR INKS CONTAINING TRIARYL METHANE DYESTUFFS

FIELD OF THE INVENTION

Our present invention relates to an ink eradicator or ink decolorant for inks containing triaryl methane dyestuffs. More particularly, the invention relates to an aqueous ink decolorant for such inks which has long term storage stability (shelf life), is substantially permanent in its decolorizing action and do not require substitution of a different ink for overwriting of a decolored region.

BACKGROUND OF THE INVENTION

Reference herein to an "ink eradicator" will be understood t mean a substance which is capable of decolorizing an ink rather than a substance which removes the ink from the substrate paper to which the ink is applied. This is, of course, the common meaning of an ink eradicator and thus the term "ink eradicator" and the expression "ink decolorizer" may be used interchangeably herein.

The inks currently in use include those based upon triaryl methane dyestuffs. It is known (see, for example, German Patent Document DE-OS 2216951) to provide an ink decolorant for such dyestuffs which comprises an aqueous solution of a decolorizing substance in the form of a reducing sulfur compound and, if desired, a binder and other additives which may be conventional in ink eradicators.

The sulfite contained in this aqueous solution and serving as the reducing sulfur compound is capable of decolorizing written symbols, imprints or marks for the purposes of correction.

The ink eradicator solution generally comprises a relatively high proportion of the reducing sulfite. In this case it has been found to be necessary to substitute an ink containing another dyestuff when the corrected region must be overwritten since the remaining sulfite on the corrected region of the substrate tends to decolor a newly applied ink when the latter also contains the original dyestuff, i.e. a triaryl methane dyestuff.

As a consequence, it has been proposed to significantly reduce the sulfite proportion in the ink eradication solution. Low sulfite quantities in the ink eradication solution, however, give rise to a poor shelf life of the product, i.e. a failure of the ink eradicator to function after long term storage, since the sulfite is converted into ineffective sulfate by the action of air or oxygen.

In Europatent publication 0032652, this problem is attacked by incorporating a basic nitrogen compound in small concentrations as the decolorizing substance and by adjusting the pH value so that the nitrogen compound is present as the free base.

The basic nitrogen compound, which functions as a Lewis base, like the sulfite, eliminates the problem of the poor shelf life of a sulfite containing ink eradicator. Since the basic nitrogen compounds must be present as free bases, the pH value of the ink eradicator solution must be in a more or less strongly alkaline range. The high alkalinity of such solutions can result, upon application of the ink eradicator solution to the paper region to be corrected, in damage to the paper structure, so that upon overwriting the paper fibers may be pulled out and the desired sharp correction and high resolution cannot be achieved.

Reference may also be made to German Patent Document DE-AS 1111760 which discloses the presence of glycerine in a solution used for ink eradication.

By and large, all of these prior art systems have not been fully satisfactory for one or more reasons. The product may not have satisfactory shelf life; the product may not be capable of The product may not be capable of satisfactorily decolorizing the ink symbols to be corrected; the product may damage the paper, etc.

OBJECTS OF THE INVENTION

It is, therefore, the principal object of the present inventor to provide an improved ink eradication or decolorizing solution for triaryl methane dyestuff inks whereby the drawbacks of the prior art compositions are avoided.

Another object of the invention is to provide a decolorizing solution for triaryl methane dyestuff inks which can substantially completely remove visible traces of the previously applied symbols written in triaryl methane dyestuff inks, can be readily overwritten with such inks, has an improved shelf life and, in general, is free from many of the drawbacks outlined above.

DESCRIPTION OF THE INVENTION

These objects and others which will become apparent hereinafter are attained, in accordance with the present invention in an ink eradicator or decolorizer composition which consists of an aqueous solution of a reducing sulfur compound, the solution having a sugar component and a reducing sulfur component, the sugar component being present in an amount of 2 to 50% by weight of the solution and the reducing sulfur component being present in an amount of about 1 to 5% by weight of the solution. The sugar component is preferably at least one sugar and/or at least one solid sugar alcohol, the latter being preferably selected from the group which consists of sorbite, mannite, dulcite, erythrite, xylite and glucite.

The principle of the invention is based upon our discovery that a relatively small amount of the reducing sulfur compounds can serve to eliminate the color of printed or written symbols utilizing triaryl methane dyestuff inks, while the presence of the sugar and/or the solid sugar alcohol can provide a long shelf life without the danger of oxidation of the reducing sulfur compound to sulfate in the solution. It is indeed surprising that a sugar or a solid sugar alcohol, or a mixture thereof, can prevent the detrimental oxidation of the reducing sulfur compounds to a very significant extent.

It appears, although we do not wish to be bound to this theory, that the sugar and solid sugar alcohols reduce the solubility of air and thus of oxygen in water so that the oxidation effect of oxygen upon the reducing sulfur compounds is significantly retarded.

The use of more or less high proportions of sugar and/or solid sugar alcohol gives rise to a reduction in the tendency in the solution to swell the substrate paper and enables high resolution correction to be achieved at the correction site.

With respect to the solid sugar alcohols used, while the above listed species proved to be the most effective, we do not wish to be limited by this list since it is not exhausted. What is important is that neither the sugar nor the sugar alcohols used should be in a liquid state under normal conditions, i.e. at ambient temperature pressure and relative humidity. Furthermore, the sugar or sugar alcohol used should not have additional functional groups which can give rise to a detrimental effect at the correction site, e.g. by side reactions with the triaryl methane dyestuff.

In this sense, therefore, the term sugar and solid sugar alcohol should be construed most broadly.

As a practical matter, the term "sugar" as used herein will refer to organic compounds with hemiacetal carbonyl and multiple hydroxyl groups per molecule, to polyhydroxyaldehydes (aldoses) or polyhydroxyketones (ketoses). The term, therefore, is not limited to saccharose which also is generally referred to as cane sugar or beet sugar, but also to carbohydrates, especially monosaccharides, disaccharides and oliogosaccharides. Preferred sugars are the mono and disaccharides.

Especially effective results are obtainable with saccharose, trehalose, lactose, maltose and cellobiose as the preferred disaccharides and glucose, fructose, mannose, galactose, ribose, sorbose, allose, altrose, gulose, idose, talose and invert sugar or hydrolyzed disaccharides, as preferred monosaccharide sugars.

In line with the breadth of the term "sugars" as used herein, it is especially mentioned that pseudosugars also are deemed to be within the scope of the invention. The pseudosugars are those sugars in which a ring oxygen of a pyranose is replaced by a methylene group. The "sugars" of the invention also include desoxy sugars or amino sugars in which a CH(OH) group is replaced by a $CH_2=$ or a $CH(NH_2)$ group.

The solid sugar alcohols which can be used, in general, include those which can be made from monosaccharides by reduction of a carbonyl function to polyhydroxy compounds which are no longer sugars but still have a sweet taste and thus are generally interchangeable with sugars. In the context of the invention, these sugar alcohols like the saccharides within the scope of the invention at room temperature (about 20° C.) will be solid. This requirement is satisfied by sorbite, mannite, dulcite, erthrite, xylite and glucite which have already been indicated to be particularly advantageous according to the invention.

The sugar or sugar alcohol component can include any number of the above mentioned sugars or sugar alcohols in any proportions and in any admixtures.

The sugar component should be present in an amount of 2 to 50% by weight of the solution. If one has a sugar content above the upper limit of about 50% by weight, the solubility may be effected or the solubilization speed may be unsatisfactory.

Below the lower limit of 2% by weight, the desired stabilization of the ink eradicator solution may be lost. The preferred range for the sugar component is between 5 to 35% by weight of the solution and even more preferably between 5 to 25% by weight, of the solution.

It has already been noted that the reducing sulfur compounds, which may be one or more in number, can form a reducing sulfur component which is present in an amount of about 0.1 to 5% by weight of the solution. Preferably a range of 0.1 to 2% by weight of the solution is used and it is possible to utilize especially low concentrations of the sulfite, for example, in the range of 0.3 to 0.8% by weight of the solution.

The type of reducing sulfur compound which is used is not critical to the invention as long as that compound or those compounds are soluble in water and are capable of providing the necessary reducing effect to decolor the triaryl methane dyestuff ink.

Water soluble reducing sulfur compounds can be sodium or potassium sulfites, corresponding disulfites and even higher sulfites.

It will be apparent that there are many functionally equivalent compounds which can be used with the sulfites or substituted for them and also constitute reducing sulfur compounds which can be utilized in accordance with the invention. These include dithionite and adducts in the form of organic sulfur compounds such as formaldehyde sulfoxyalte, nitrilotrimethane sulfinic acid, trisodium salt and hydroxymethane sulfinic acid sodium salt, the latter being marketed under the trade names RONGALE or RONGALITE.

It has been found to be advantageous, in some cases, to incorporate in the ink eradicator solution still another Lewis base, for example, ammonia, an oligomeric to polymeric alkylene amine or alkylene imine, a basic nitrogen compound with additional nitrogen free functional groups, for example, amino acids, amino alcohols, imide, amides, lactam and hydroxyl-ammonium compounds. These additional compounds appear to improve the ink eradicator effect of the solution and can be provided in amounts of 0.05 to 9 weight % of the solution and especially 0.1 to 5 weight % thereof.

For quick drying at the correction site, we have found it to be advantageous to incorporate in the solution a volatile substance such as a volatile alcohol like ethanol preferably in an amount of about 2 to 20% by weight, especially about 5 to 15% by weight.

Apart from the described substances, the ink eradicator solution of the invention can also include other known substances for example wetting agents like alkyl phenol polyglycol ethers, moisture retentive agents like glycerine, diglycol and triglycol, binders like cellulose ethers and acrylates or the like.

The significant advantages of the ink eradication solutions include rapid and complete ink eradication effects with a practically unlimited shelf life of the solutions which appears to result from the combination of the sugar component with the reducing sulfur component and the protection afforded by the sugar component for the reducing sulfur component against oxidation by oxygen. In an open container the shelf life is more than half a year. The corrected region may be over written by the same ink, presumably as a result of the low concentration of the reducing sulfur component in the correction solution. This is especially the case when the concentration of the reducing sulfur component is between 0.1 and 2% by weight of the solution.

Conventional sulfite containing ink eradicators have sulfite contents of up to 10% by weight of sulfite. Because of the reduced concentration of the reducing sulfur contents, relatively small quantities of the decoloring substance remain on the paper, especially in the case of a single connection at the site. Of course, build up of the sulfite can occur with multiple corrections.

In general, therefore, there is only a minor surplus of the decolorizing substance on the paper and this generally will not interfere with overwriting with the same ink without significant decolorizing effect thereon. The result will be a permanent correction.

Since the overwriting uses the same ink and can be made with the same writing apparatus, generally differences between the correction and the original are not noticeable.

It is important, of course, to be certain that the corrected region is blotted before overwriting, i.e. that the corrected region is substantially dry so that the ink will not run into the paper fibers.

Because of the proportion of sugar and/or sugar alcohol in the solution of the invention, a loosening of the fibers in the surface of the paper in the connected region is largely excluded. As a consequence, it generally is not necessary to incorporate the binders which have characterized other ink eradicator solutions in the solution of the invention, although the use of such binders may be desirable from time to time.

SPECIFIC EXAMPLES (all % by weight)

| INK ERADICATOR SOLUTION 1 | |
| --- | --- |
| WATER | 77.2% |
| GLYCERINE | 2.0% |
| SODIUM SULFITE | 0.8% |
| SORBITE | 20.0% |
| INK ERADICATOR SOLUTION 2 | |
| WATER | 78.2% |
| POLYETHYLENE IMINE (POLYIMINE P OF BASF) | 1.0% |
| SODIUM SULFITE | 0.8% |
| FRUCTOSE | 20.0% |
| INK ERADICATOR SOLUTION 3 | |
| WATER | 73.8% |
| METHYLHYDROXYETHYL CELLULOSE | 0.2% |
| SODIUM SULFITE | 1.0% |
| CANE SUGAR | 20.0% |
| ETHANOL | 5.0% |
| INK ERADICATOR SOLUTION 4 | |
| SODIUM SULFITE | 1.0% |
| SORBITE | 5.0% |
| MANNITE | 5.0% |
| FRUCTOSE | 5.0% |
| CANE SUGAR | 5.0% |
| ETHANOL | 5.0% |
| METHYLHYDROXY | 0.2% |
| BALANCE WATER | |

The aqueous solutions described were tested on written symbols formed from triaryl methane dyestuff ink from a fountain pen on standard bond paper. The solutions in all cases immediately eradicated all trace of color. After drying of the corrected region, the same pen could be used to overwrite the region with a clean high resolution correction. The corrective writing did not have to be repeated to provide a permanent symbol. The solutions were storable for more than ½ year.

We claim:

1. An aqueous ink eradicator solution for decoloring a triarylmethane dyestuff ink on a substrate, comprising:
   (a) substantially 2 to 50 wt % of a sugar component selected from the group consisting of at least one sugar, at least one solid sugar alcohol and mixtures thereof; and
   (b) substantially 0.1 to 5 wt % of a reducing sulfur component consisting of at least one reducing sulfur compound.

2. The aqueous ink eradicator solution defined in claim 1 wherein said at least one sugar is selected from the group consisting of a monosaccharide and a disaccharide.

3. The aqueous ink eradicator solution defined in claim 2 wherein said at least one sugar is selected from the group consisting of saccharose, fructose, glucose and mannose.

4. The aqueous ink eradicator solution defined in claim 1 wherein said at least one sugar alcohol is selected from the group consisting of sorbite, mannite, dulcite, erythrite, xylite and glucite.

5. The aqueous ink eradicator solution defined in claim 1 wherein said sugar component is present in an amount of substantially 5 to 25 wt % in said solution.

6. The aqueous ink eradicator solution defined in claim 1, further comprising, as as additional ingredient of said solution, a Lewis base.

7. The aqueous ink eradicator solution defined in claim 6 wherein said Lewis base is selected from the group which consists of ammonia, an oligomeric to polymeric alkyleneamine or alkyleneimine and a basic nitrogen compound with additional nitrogen-free functional groups, and mixtures thereof.

8. The aqueous ink eradicator solution defined in claim 7 wherein said Lewis base is present in said solution in an amount of 0.1 to 5 wt %.

9. The aqueous ink eradicator solution defined in claim 1 wherein said reducing sulfur component is present in said solution in an amount of 0.1 to 2 wt %.

10. The aqueous ink eradicator solution defined in claim 1 wherein said solution contains a volatile alcohol.

11. The aqueous ink eradicator solution defined in claim 10 wherein said volatile alcohol is ethanol.

12. The aqueous ink eradicator solution defined in claim 10 wherein said volatile alcohol is present in an amount of 5 to 15 wt % of said solution.

13. The aqueous ink eradicator solution defined in claim 12 wherein aid volatile alcohol is ethanol.

14. The aqueous ink eradicator solution defined in claim 13 wherein said reducing sulfur component is present in said solution in an amount of 0.1 to 2 % and is selected from the group which consists of sodium sulfite, potassium sulfite, a disulfite, dithionite, formaldehyde-sulfoxylate, nitrilotrimethanesulfinic acid trisodium salt and hydroxymethanesulfinic acid sodium salt.

15. The aqueous ink eradicator solution defined in claim 14, further comprising, as as additional ingredient of said solution, a Lewis base selected from the group which consists of ammonia, an oligomeric to polymeric alkylneamine or alkyleneimine and a basic nitrogen compound with additional nitrogen-free functional groups, and mixtures thereof.

16. The aqueous ink eradicator solution defined in claim 15 wherein said Lewis base is present in said solution in an amount of 0.1 and 5 wt %.

17. The aqueous ink eradicator solution defined in claim 16 wherein said at least one sugar is selected from the group consisting of a monosaccharide and a disaccharide.

18. The aqueous ink eradicator solution defined in claim 16 wherein said at least one sugar is selected from the group which consists of saccharose, fructose, glucose and mannose.

19. The aqueous ink eradicator solution defined in claim 66 wherein said at least one sugar alcohol is selected from the group which consists of sorbite, mannite, dulcite, erythrite, xylite and glucite.

20. The aqueous ink eradicator solution defined in claim 16 wherein said at least one sugar is present in an amount of substantially 5 to 25 wt % in said solution.

* * * * *